United States Patent
Shi et al.

(10) Patent No.: US 11,940,348 B1
(45) Date of Patent: Mar. 26, 2024

(54) SYSTEM AND METHOD FOR DETECTING CENTROID OF COMPLEMENTARY SINGLE PIXEL

(71) Applicant: Hefei Institutes of Physical Science, Chinese Academy of Sciences, Hefei (CN)

(72) Inventors: Dongfeng Shi, Hefei (CN); Yingjian Wang, Hefei (CN); Jian Huang, Hefei (CN); Yafeng Chen, Hefei (CN); Ke'e Yuan, Hefei (CN); Linbin Cha, Hefei (CN)

(73) Assignee: Hefei Institutes of Physical Science, Chinese Academy of Sciences, Hefei (CN)

( * ) Notice: Subject to any disclaimer, the term of this patent is extended or adjusted under 35 U.S.C. 154(b) by 0 days.

(21) Appl. No.: 18/517,487

(22) Filed: Nov. 22, 2023

Related U.S. Application Data

(63) Continuation of application No. PCT/CN2022/070605, filed on Jan. 7, 2022.

(30) Foreign Application Priority Data

Sep. 6, 2021 (CN) .......................... 202111046776.3

(51) Int. Cl.
*G01M 11/00* (2006.01)

(52) U.S. Cl.
CPC .................................. *G01M 11/00* (2013.01)

(58) Field of Classification Search
CPC ...... G01M 1/122; G06F 17/15; G01S 7/4816; G01S 17/06; H04B 10/516; H04N 9/31; H04N 9/3102

(Continued)

(56) References Cited

U.S. PATENT DOCUMENTS 10,700,779 B1 * 6/2020 Panas ..................... H04B 10/66
10,802,066 B1 * 10/2020 Keaveney .......... G01R 29/0885
(Continued)

FOREIGN PATENT DOCUMENTS

| CN | 102169020 A | 8/2011 |
| CN | 110850433 A | 2/2020 |
| CN | 113049184 A | 6/2021 |

OTHER PUBLICATIONS

Fan et al., Spot centroiding algorithm for discrete noise image and its hardware implementation, Optics and Precision Engineering, 2011, 19(12), pp. 2992-2998, dated Dec. 15, 2011.
(Continued)

*Primary Examiner* — Isiaka O Akanbi
(74) *Attorney, Agent, or Firm* — Westbridge IP LLC

(57) ABSTRACT

Disclosed are a system and a method for detecting a centroid of a complementary single pixel. The system includes a lens group, a single-pixel detector assembly, a Digital Micromirror Device (DMD) and an acquisition and processing unit. The acquisition and processing unit generates two-dimensional modulation matrices A and B which are loaded into the DMD; the lens group processes light reflected or transmitted from a target object, such that an image of the target object is imaged on the DMD; and the acquisition and processing unit is connected with data output ends of two single-pixel detectors in respective, to calculate the centroid of the target object. The DMD modulates an image signal of the target object according to modulation information A and B; the single-pixel detector assembly includes a first single-pixel detector and a second single-pixel detector.

4 Claims, 4 Drawing Sheets

(58) Field of Classification Search
USPC ................ 356/326, 634, 600–624, 486, 450; 702/150
See application file for complete search history.

(56) References Cited

U.S. PATENT DOCUMENTS

| | | | |
|---|---|---|---|
| 2011/0025870 A1* | 2/2011 | Baraniuk | H04L 25/20 375/E7.076 |
| 2011/0211077 A1* | 9/2011 | Nayar | G02B 26/0833 348/E5.022 |
| 2012/0033084 A1 | 2/2012 | Bhargava et al. | |
| 2013/0088726 A1* | 4/2013 | Goyal | G01S 17/10 356/634 |
| 2015/0029503 A1* | 1/2015 | McMackin | G01J 3/2823 703/2 |
| 2017/0176338 A1* | 6/2017 | Wu | G01N 21/6428 |
| 2020/0249354 A1* | 8/2020 | Yeruhami | G01S 17/931 |
| 2020/0284724 A1* | 9/2020 | Dholakia | G02B 21/0032 |
| 2020/0342205 A1* | 10/2020 | Park | G01N 21/6458 |
| 2020/0370959 A1* | 11/2020 | Lombez | G01N 21/6408 |

OTHER PUBLICATIONS

First Office Action issued in counterpart Chinese Patent Application No. 202111046776.3, dated Mar. 21, 2023.

\* cited by examiner

SYSTEM AND METHOD FOR DETECTING CENTROID OF COMPLEMENTARY SINGLE PIXEL

CROSS-REFERENCE TO RELATED APPLICATION

This application is a continuation of International Application No. PCT/CN2022/070605, filed on Jan. 7, 2022, which claims priority to Chinese Patent Application No. 202111046776.3, filed on Sep. 6, 2021. All of the aforementioned applications are incorporated herein by reference in their entireties.

TECHNICAL FIELD

The present disclosure belongs to the technical field of computing imaging and centroid detection, and particularly relates to a system and a method for detecting a centroid of a complementary single pixel.

BACKGROUND

In the field of centroid detection, the traditional methods are all that an object image is acquired first by an area-array camera, and then a centroid of a target object is calculated from the image through a corresponding image processing algorithm, and the quality of the captured object image decides the accuracy of the detected centroid.

In a case of low signal to noise ratio, the quality of the image photographed by the area-array camera will be greatly affected, and some area-array cameras with invisible bands (infrared, terahertz, etc.) are either high in cost or incapable of working effectively. The range of use of the traditional method for detecting the centroid is limited. Compared with a traditional Charge Coupled Device (CCD), a Complementary Metal Oxide Semiconductor (CMOS) and other digital imaging techniques taking an area-array photosensitive element as a core, a single-pixel imaging technique uses space-time transformation light to illuminate the target object or modulate the object image, and physical information is sampled through a detector with only one pixel unit, and finally object information is reestablished by using a corresponding algorithm.

The advantages of the single-pixel imaging are mainly reflected in two aspects, and since the single-pixel detector has a wider spectral response range and a higher light sensitivity, the single-pixel imaging may be applied in a band which an array camera cannot respond in or is expensive as well as low-light imaging. By combining single pixel imaging methods with centroid detection, it is possible to work within weak light and wide spectral response ranges, while also getting rid of a limitation that an imaging frame frequency is not high.

SUMMARY

To improve the centroid detection speed, the present disclosure provides a system and a method for detecting a centroid of a complementary single pixel, with the specific solution as follows.

A system for detecting a centroid of a complementary single pixel includes a lens group, a single-pixel detector assembly, a Digital Micromirror Device (DMD) and an acquisition and processing unit.

The acquisition and processing unit generates a two-dimensional modulation matrix A and a two-dimensional modulation matrix B which are loaded into the DMD, and let each column of element value of the two-dimensional modulation matrix A be equal to a column number and each row of element value of the two-dimensional modulation matrix B be equal to a row number.

The lens group processes light reflected or transmitted from a target object, such that an image of the target object is imaged on the DMD.

The DMD modulates an image signal of the target object according to two-dimensional modulation information.

The single-pixel detector assembly includes a first single-pixel detector and a second single-pixel detector, which acquire intensity values of reflected light in two complementary directions of the DMD, respectively.

The acquisition and processing unit is connected with data output ends of the first single-pixel detector and the second single-pixel detector respectively, to calculate the centroid of the target object.

Specifically, the DMD is composed of a plurality of micromirrors, and each of the micromirrors may rotate back and forth between a positive angle and a negative angle, to correspond to "0" and "1" states of a microelement of the DMD; and light intensities of the DMD in two reflection directions are complementary.

Specifically, a model of the DMD is DLP7000, and the DMD is composed of 768×1024 micromirrors.

Specifically, the system further includes a light source, which is used to illuminate the target object.

Specifically, the acquisition and processing unit includes a computer and a data acquisition unit which are connected, the computer is connected with the DMD, and ports of the data acquisition unit are correspondingly connected with the first single-pixel detector and the second single-pixel detector.

A method for detecting a centroid of a complementary single pixel, including the following steps of:

S1: generating, by a computer in an acquisition and processing unit, a two-dimensional modulation matrix A and a two-dimensional modulation matrix B, which are represented by two-dimensional functions, respectively.

An abscissa direction and an ordinate direction of a coordinate system where the two-dimensional functions are located correspond to a row direction and a column direction of the two-dimensional modulation matrix in respective, a two-dimensional function value corresponds to an element value of the two-dimensional modulation matrix, and the two-dimensional functions that correspond to the two-dimensional modulation matrix A and the two-dimensional modulation matrix B meet the following relational expressions in respective:

$$S_1(x,y)=x \qquad (1)$$

$$S_2(x,y)=y \qquad (2)$$

In the formula, $S_n(x, y)(n=1, 2)$ represents an element value corresponding to a coordinate (x, y) in the two-dimensional modulation matrix.

S2: loading the generated modulation information into the DMD, to modulate an image of a target object.

S3: acquiring, by a data acquisition unit, intensity values of reflected light in two complementary directions of the DMD by using a first single-pixel detector and a second single-pixel detector.

S4: solving the centroid according to a centroid solving algorithm.

Preferably, when S1 further includes transforming the two-dimensional modulation matrix A and the two-dimensional modulation matrix B into binarization modulation matrices by adopting a space jitter method, the modulation information in S2 is the binarization modulation matrices.

Specifically, in S3, the intensity values of the reflected light acquired by calculating the first single-pixel detector and the second single-pixel detector are represented as:

$$l_{1,k}^0 = \Sigma_{x,y} f(x,y) S_k^0(x,y) \quad (3)$$

$$l_{2,k}^1 = \Sigma_{x,y} f(x,y) S_k^1(x,y) \quad (4)$$

In the formula, f(x,y) is a two-dimensional distribution function of the image of the target object, a superscript takes 0 and 1, which correspond to states of a positive angle and a negative angle of the DMD in respective, a subscript takes 1 and 2, which represent the first single-pixel detector and the second single-pixel detector in respective, k takes 1 and 2, which represent two two-dimensional modulation information of the DMD in respective, and $S_k^1$ and $S_k^0$ represent two complementary modulation information under a $k^{th}$ modulation information in respective.

Specifically, a computational formula that the centroid $(x_c, y_c)$ is solved by the centroid solving algorithm is as follows:

$$x_c = \frac{\sum_{x,y} f(x,y)x}{\sum_{x,y} f(x,y)} \quad (5)$$

$$y_c = \frac{\sum_{x,y} f(x,y)y}{\sum_{x,y} f(x,y)} \quad (6)$$

By combining formulas (3) and (4) with formulas (5) and (6), a centroid position parameter of the target object may be represented as:

$$x = \frac{I_{1,1}^0}{I_{1,1}^0 + I_{2,1}^1} \quad (7)$$

$$y = \frac{I_{1,2}^0}{I_{1,2}^0 + I_{2,2}^1} \quad (8)$$

The present disclosure has the following beneficial effects.

In the present disclosure, the centroid of the target object is directly acquired under the premise of not imaging, and the system uses the characteristics of the complementary structure of the DMD, which can further reduce the quantity of the modulation information used and improve the centroid detection speed.

The setting of the light source is used to illuminate the target object, making the target object image well.

In the method, when S1 adopts the space jitter method to be transformed into the binaryzation modulation matrix, the high-speed modulation demands are met, and the high-speed binary modulation performance of the DMD is used fully.

DETAILED DESCRIPTION OF THE EMBODIMENTS

Figure 2:
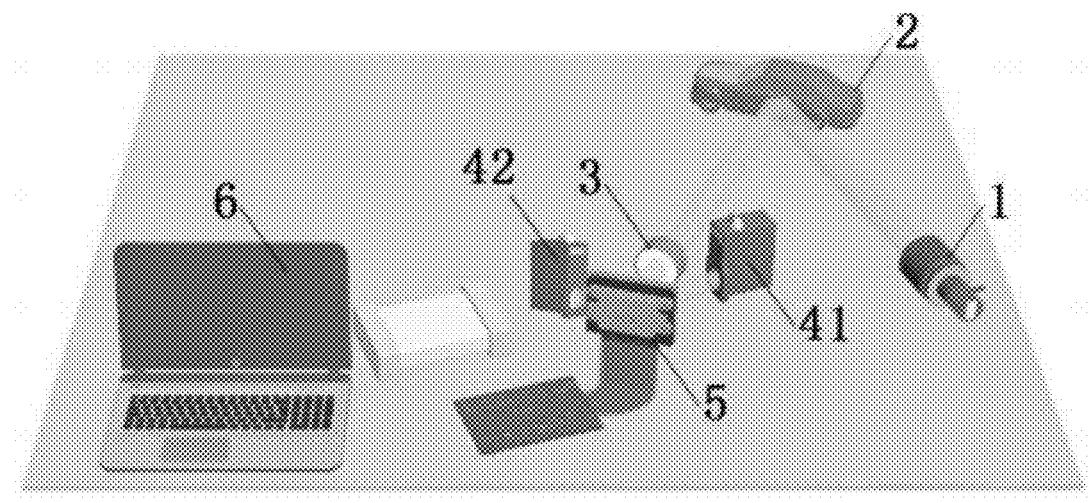
FIG. 2 is a structural diagram of a system for detecting a centroid of a complementary single pixel.

As shown in FIG. 2, a system for detecting a centroid of a complementary single pixel includes a lens group 3, a single-pixel detector assembly 4, a DMD 5 and an acquisition and processing unit; and preferably the system may also include a light source 1 for illuminating a target object. The acquisition and processing unit includes a computer 6 and a data acquisition unit that are connected.

The computer generates a two-dimensional modulation matrix A and a two-dimensional modulation matrix B which are loaded into the DMD 5, and let each column of element value of the two-dimensional modulation matrix A be equal to a column number and each row of element value of the two-dimensional modulation matrix B be equal to a row number.

The lens group 3 processes light reflected or transmitted from the target object 2, such that an image of the target object is imaged on the DMD 5.

Figure 3:
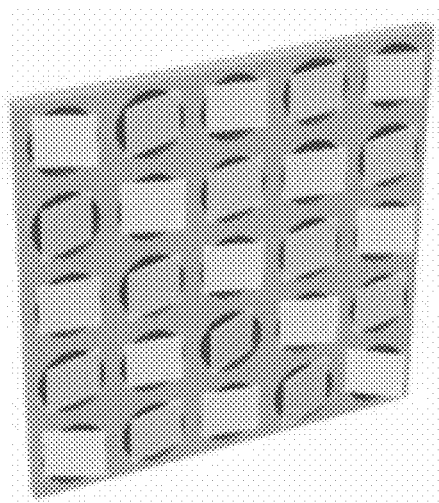
FIG. 3 is a structure schematic diagram of a micromirror in DMD.
Figure 4:
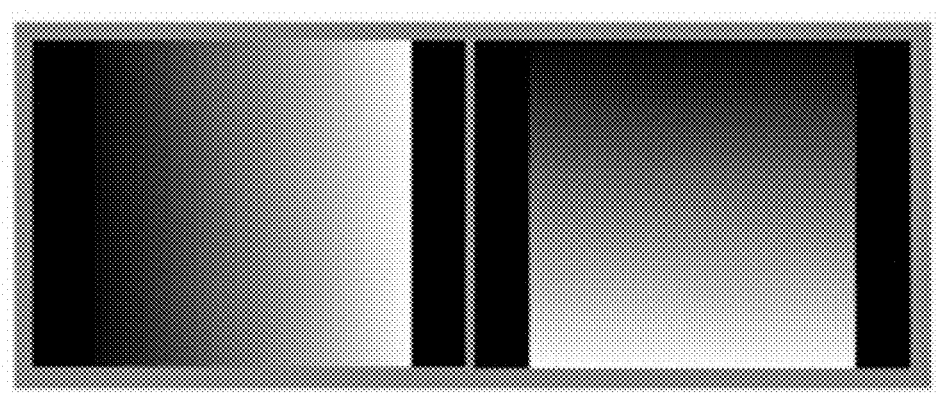
FIG. 4 is a diagram of two pieces of generated modulation information.

The DMD 5 modulates an image signal of the target object according to two-dimensional modulation information. FIG. 4 shows a schematic diagram of some micromirror structures therein, each of the micromirrors in FIG. 3 may rotate back and forth between a positive angle and a negative angle, corresponding to "0" and "1" states of a microelement of the DMD 5. The light intensities of the DMD 5 in two reflection directions are complementary, that is to say, the intensity sum of two beams of reflected light is equal to the intensity of the reflected light that the DMD 5 serves as a plane mirror. In this embodiment, a model of the DMD 5 is DLP7000, and the DMD 5 is composed of 768×1024 micromirrors, with a positive and negative angle of 12°.

The single-pixel detector assembly includes a first single-pixel detector 41 and a second single-pixel detector 42, which acquire intensity values of reflected light in two complementary directions of the DMD 5, respectively; and both the first single-pixel detector 41 and the second single-pixel detector 42 are single-point photoelectric detectors.

The data acquisition unit in the acquisition and processing unit is connected with data output ends of the first single-pixel detector 41 and the second single-pixel detector 42 in respective, the data acquisition unit uploads the collected data into the computer 6, and the computer 6 calculates the centroid of the target object 2.

Figure 1:
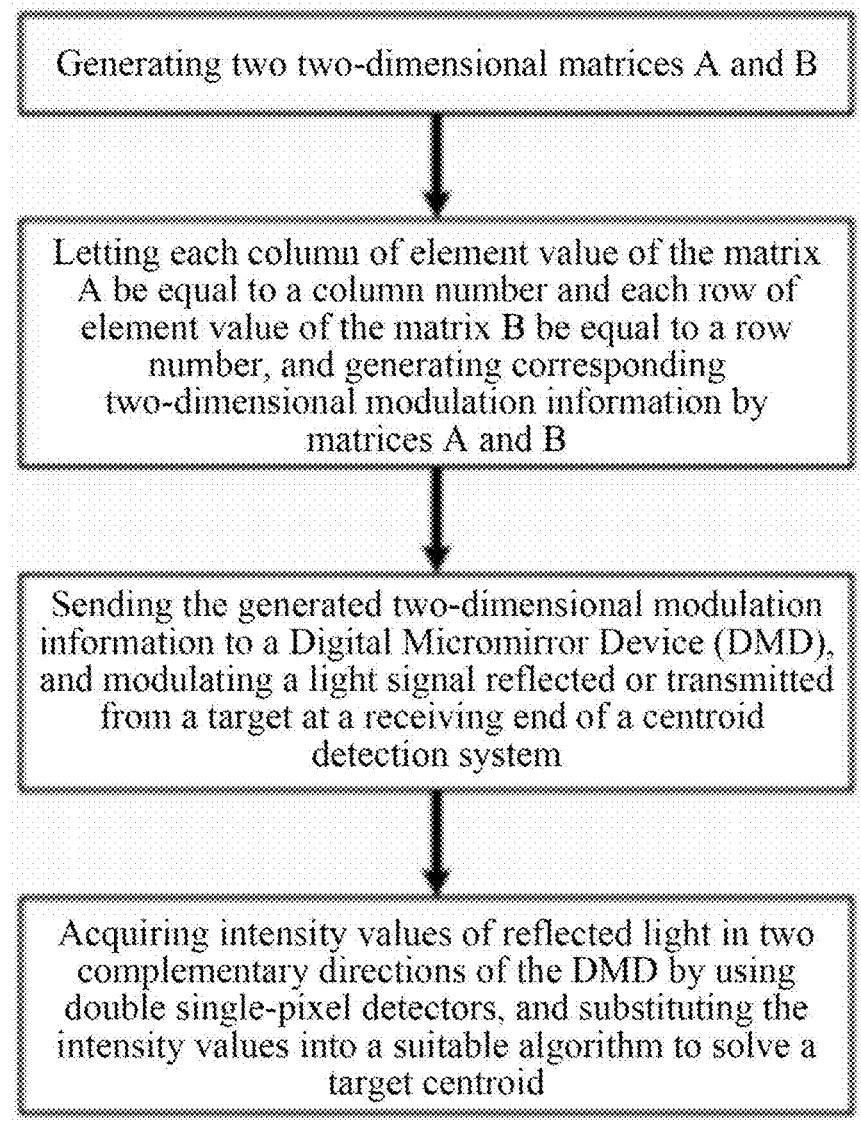
FIG. 1 is a flowchart for detecting a centroid of a complementary single pixel.

As shown in FIG. 1, a method for detecting a centroid of a complementary single pixel based on the foregoing system includes the following steps of:

generating, by a computer in an acquisition and processing unit, a two-dimensional modulation matrix A and a two-dimensional modulation matrix B, which are represented by two-dimensional functions, respectively.

An abscissa direction and an ordinate direction of a coordinate system where the two-dimensional functions are located correspond to a row direction and a column direction of the two-dimensional modulation matrix in respective, a two-dimensional function value corresponds to an element value of the two-dimensional modulation matrix, and the two-dimensional functions that correspond to the two-dimensional modulation matrix A and the two-dimensional modulation matrix B meet the following relational expressions in respective.

$$S_1(x,y)=x \qquad (1)$$

$$S_2(x,y)=y \qquad (2)$$

In the formula, $S_n(x, y)(n=1, 2)$ represents an element value corresponding to a coordinate (x, y) in the two-dimensional modulation matrix.

If the high-speed modulation is required, in order to make full use of the high-speed binary modulation performance of the DMD, the computer 6 may be used to transform the two-dimensional modulation matrix A and the two-dimensional modulation matrix B into the binaryzation modulation matrices by adopting the space jitter method, as shown in FIG. 4, and the high-speed binaryzation modulation frequency of the DMD 5 may be used fully when applying the space jitter method.

loading the modulation information in FIG. 4 into the DMD 5, to modulate the image of the target object, where when the high-speed modulation is not required, the modulation information is the functions corresponding to the two-dimensional modulation matrix A and the two-dimensional modulation matrix B, and when the high-speed modulation is required, the modulation information is the binaryzation modulation matrix.

acquiring intensity values of reflected light in two complementary directions of the DMD by using the first single-pixel detector 41 and the second single-pixel detector 42. The intensity values of the reflected light acquired by calculating the first single-pixel detector 41 and the second single-pixel detector 42 are represented as:

$$I_{1,k}^0 = \Sigma_{x,y} f(x,y) S_k^0(x,y) \qquad (3)$$

$$I_{2,k}^1 = \Sigma_{x,y} f(x,y) S_k^1(x,y) \qquad (4)$$

In the formula, f(x,y) is a two-dimensional distribution function of an image of the target object (2), a superscript takes 0 and 1, which correspond to states of a positive angle and a negative angle of the DMD (5) in respective, a subscript takes 1 and 2, which represent the first single-pixel detector 41 and the second single-pixel detector 42 in respective, k takes 1 and 2, which represent two two-dimensional modulation information of the DMD 5 in respective, and and $k^{th}$ represent two complementary modulation information under a $k^{th}$ modulation information in respective.

solving the centroid $(x_c, y_c)$, and the computational formula is as follows.

$$x_c = \frac{\sum_{x,y} f(x,y)x}{\sum_{x,y} f(x,y)} \qquad (5)$$

$$y_c = \frac{\sum_{x,y} f(x,y)y}{\sum_{x,y} f(x,y)} \qquad (6)$$

By combining formulas (3) and (4) with formulas (5) and (6), the centroid position parameter of the target object 2 may be represented as.

$$x = \frac{I_{1,1}^0}{I_{1,1}^0 + I_{2,1}^1} \qquad (7)$$

$$y = \frac{I_{1,2}^0}{I_{1,2}^0 + I_{2,2}^1}. \qquad (8)$$

In the present disclosure, the structural characteristics of the DMD 5 are used fully by combining the single-pixel imaging method with the centroid detection method, and the centroid of the target object 2 is directly acquired by only two pieces of modulation information under a premise of not imaging. When the maximum modulation frequency of the DMD 5 is 22 kHz, the detection of the frame frequency by the centroid above 11 KHz may be achieved by using the technique, which may be applied in the fields such as tracking the target object 2 quickly.

In conclusion, the above is only the specific implementation mode of the present disclosure, but the scope of protection of the present disclosure is not limited to this. Those skilled in the art can make equal replacements or changes according to the technical solution and its concept of the present disclosure in the technical scope of the present disclosure, and those replacements or changes shall be covered by the scope of protection of the present disclosure.

What is claimed is:

1. A method for detecting a centroid of a complementary single pixel, comprising the following steps of:
    generating, by a computer in an acquisition and processing unit, a two-dimensional modulation matrix A and a two-dimensional modulation matrix B, which are represented by two-dimensional functions, respectively;
    wherein an abscissa direction and an ordinate direction of a coordinate system where the two-dimensional functions are located correspond to a row direction and a column direction of the two-dimensional modulation matrix in respective, a two-dimensional function value corresponds to an element value of the two-dimensional modulation matrix, and the two-dimensional functions that correspond to the two-dimensional modulation matrix A and the two-dimensional modulation matrix B meet the following relational expressions in respective:

$$S_1(x,y)=x \qquad (1)$$

$$S_2(x,y)=y \qquad (2)$$

in the formula, $S_n(x, y)(n=1, 2)$ represents an element value corresponding to a coordinate (x, y) in the two-dimensional modulation matrix;

loading the generated modulation information into the DMD, to modulate an image of a target object;

acquiring, by a data acquisition unit, intensity values of reflected light in two complementary directions of the DMD by using a first single-pixel detector and a second single-pixel detector; and solving the centroid according to a centroid solving algorithm.

2. The method for detecting the centroid of the complementary single pixel according to claim 1, wherein when S1 further comprises transforming the two-dimensional modulation matrix A and the two-dimensional modulation matrix B into binarization modulation matrices by adopting a space jitter method, the modulation information in S2 is the binarization modulation matrices.

3. The method for detecting the centroid of the complementary single pixel according to claim 1, wherein in S3, the intensity values of the reflected light acquired by calculating the first single-pixel detector and the second single-pixel detector are represented as:

$$I_{1,k}^0 = \Sigma_{x,y} f(x,y) S_k^0(x,y) \quad (3)$$

$$I_{2,k}^1 = \Sigma_{x,y} f(x,y) S_k^1(x,y) \quad (4)$$

in the formula, f(x,y) is a two-dimensional distribution function of the image of the target object, a superscript takes 0 and 1, which correspond to states of a positive angle and a negative angle of the DMD in respective, a subscript takes 1 and 2, which represent the first single-pixel detector and the second single-pixel detector in respective, k takes 1 and 2, which represent two two-dimensional modulation information of the DMD in respective, and $S_k^1$ and $S_k^0$ represent two complementary modulation information under a $k^{th}$ modulation information in respective.

4. The method for detecting the centroid of the complementary single pixel according to claim 1, wherein a computational formula that the centroid ($x_c$, $y_c$) is solved by the centroid solving algorithm is as follows:

$$x_c = \frac{\sum_{x,y} f(x,y)x}{\sum_{x,y} f(x,y)} \quad (5)$$

$$y_c = \frac{\sum_{x,y} f(x,y)y}{\sum_{x,y} f(x,y)} \quad (6)$$

by combining formulas (3) and (4) with formulas (5) and (6), a centroid position parameter of the target object is represented as:

$$x = \frac{I_{1,1}^0}{I_{1,1}^0 + I_{2,1}^1} \quad (7)$$

$$y = \frac{I_{1,2}^0}{I_{1,2}^0 + I_{2,2}^1}. \quad (8)$$

* * * * *